Oct. 24, 1961  J. A. CHRIST  3,005,933
FAIL-SAFE PROTECTIVE CIRCUIT FOR A MAGNETIC AMPLIFIER
Filed Oct. 21, 1957
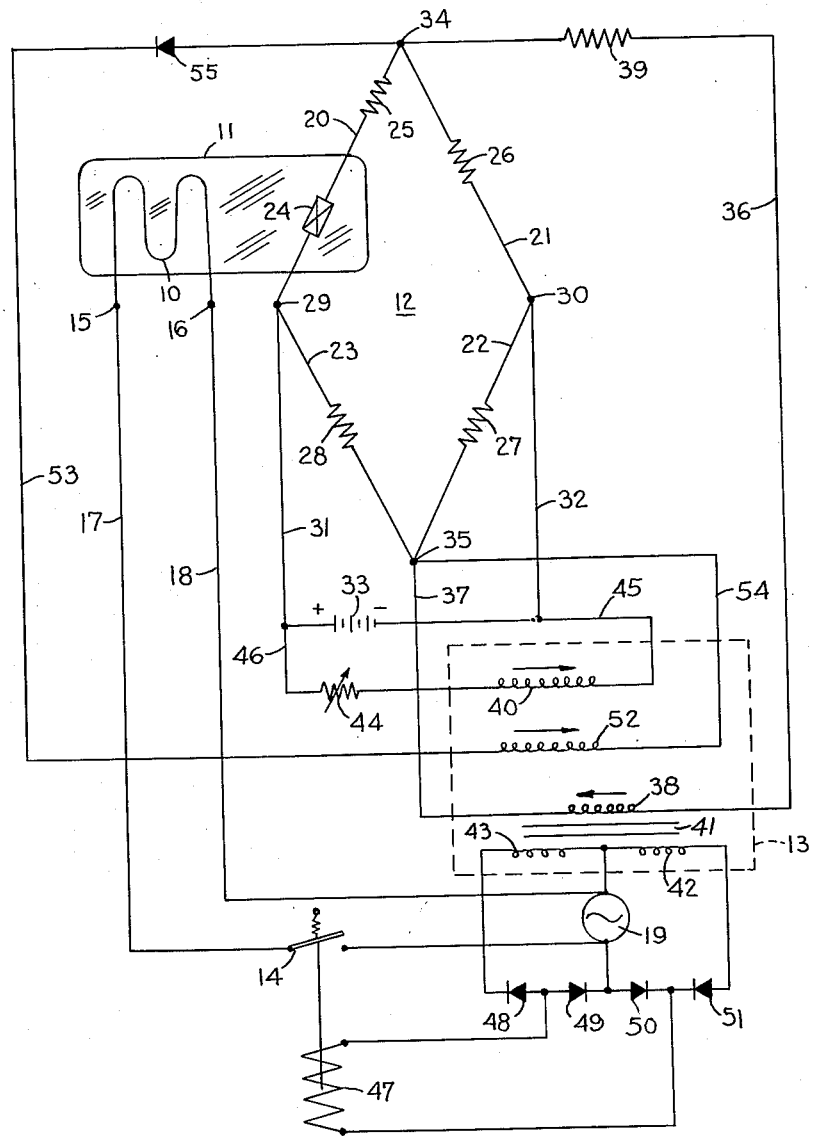
INVENTOR.
JOSEPH A. CHRIST
BY
Harvey M. Gillespie
ATTY.

3,005,933
FAIL-SAFE PROTECTIVE CIRCUIT FOR A MAGNETIC AMPLIFIER
Joseph A. Christ, Chicago, Ill., assignor to Vapor Heating Corporation, Chicago, Ill., a corporation of Delaware
Filed Oct. 21, 1957, Ser. No. 691,436
3 Claims. (Cl. 317—31)

The present invention relates to a circuit for rendering control windings of a magnetic amplifier non-conductive in the event of failure of a component of the circuit associated with the magnetic amplifier.

A principal object of the invention is to provide a circuit for protecting the components of a magnetic amplifier circuit; the electrical load whose operation the circuit controls; and/or equipment associated with the circuit against damage in the event of failure of any component thereof.

A further object is to provide, in a circuit designed to function in the manner described in the preceding paragraph, a safeguard against premature or unwarranted energization of the protective circuit.

According to the present invention, a "fail-safe" winding is added to the control side of a magnetic amplifier. This fail-safe winding is arranged and wound so that current flowing through it creates a magnetic field which is at least equal in strength, but of opposite polarity to the control winding of the magnetic amplifier. The fail-safe winding is energized only by voltages in excess of normal control voltages across a current blocking rectifier included in the circuit. When energized, the fail-safe winding cancels out the field of the control winding and renders the controlled windings of the magnetic amplifier non-conductive.

One preferred embodiment of the invention is illustrated diagrammatically in the accompanying drawing.

Referring now to the drawing, the invention, for the purpose of illustration, but not as a limitation, is shown in connection with a windshield defrosting system.

The system may be described generally as comprising an electrical load—herein shown as a heater 10 including a looped electrical resistance wire embedded in or otherwise intimately associated with a windshield glass 11, a temperature sensing bridge 12, a magnetic amplifier 13, and a switch 14 for energizing said heater 10. The terminals 15, 16 of the heater 10 are connected by the conductors 17, 18, respectively, to a source of A.C. power 19, the switch 14 being interposed in the conductor 17. The heating circuit just described is energized by the functioning of the magnetic amplifier 13 in response to a variation in temperature sensed on the face of windshield 11 by the temperature sensing bridge 12.

The said bridge is composed of two branches of two arms each. The arms are designated by the reference numerals 20, 21, 22 and 23. The arm 20 is provided with two resistors 24 and 25. The resistor 24, which is also in intimate contact with the windshield 11, has a positive temperature coefficient of resistance. The resistor 25 is not influenced by temperature changes to any appreciable extent as is also the case with resistors 26, 27, and 28 located, one each, in the other three arms 21, 22, 23, respectively, of the bridge.

One branch of the bridge comprises the arms 20, 23, and the second branch includes the arms 21, 22. The arms 20, 23 are connected at junction 29, and the arms 21, 22 are joined at junction 30. These junctions are connected by the conductors 31, 32 to a source of D.C. power 33. The junctions 34, 35, joining opposite sides of the bridge, are connected by the conductors 36, 37, to opposite ends of the control winding 38 of the magnetic amplifier 13. A sensitivity resistor 39, for rendering control of magnetic amplifier 13 by control winding 38 more stable, is interposed in conductor 36.

The magnetic amplifier 13 comprises, in addition to the control winding 38, a bias winding 40, a saturable core 41, and a pair of gate windings 42, 43. The bias winding 40 is connected in series with a variable resistance element 44 and across the D.C. power source 33 by the conductors 45, 46. The bias winding 40 is arranged and wound so that current flowing through it creates a magnetic field opposite in polarity to the magnetic field created by current flowing through the control winding 38. By means of variable resistor 44 the current flow through the bias winding 40 may be adjusted to regulate the strength of its magnetic field and to establish the extent to which its magnetic field cancels out the magnetic field of control winding 38. In this manner the conductivity of the gate windings 42, 43 may be adjusted to insure that the latter are non-conductive when the temperature sensing bridge 12 is balanced at the desired temperature control level for the windshield.

The gate windings 42, 43 respond to the magnetic field of the control winding 38 and core 41 so as to conduct current from the A.C. power source 19 to the relay armature 47, to energize the latter, and to close the switch 14. The four rectifiers 48, 49, 50 and 51 are interposed in this the controlled side of the magnetic amplifier circuit. These rectifiers are characterized in that they permit current flow through them in one direction only. They are arranged in the circuit so as to direct the flow of current through the relay armature 47 in the same direction on either cycle of the alternating current.

The windshield defrosting system is caused to operate by an unbalancing of the temperature sensing bridge 12. When unbalanced, a difference in potential exists across the junctions 34, 35 of the bridge and current flows from the D.C. power source 33 through control winding 38 creating a magnetic field which permits the gate windings 42, 43 to conduct alternating current from the A.C. power source 19 so as to energize the relay armature 47 and close switch 14. The heating circuit is thus completed to the heater 10.

If the unbalanced state of bridge 12 which inaugurated the above chain of events resulted from a reduction in temperature on the windshield and consequently a reduction in the resistance of the temperature sensitive resistor 24, the application of heat to the windshield will tend to restore the resistance of the resistor 24 to its original value so as to rebalance the bridge 12 and thereby terminate the application of heat to the windshield 11. If, however, the unbalanced state resulted from a shorting out of a portion of any one of the resistors 24, 25 or 27, or from an opening in either of the arms 21, 23, or the unbalanced state is continued as a result of such an occurrence, the application of heat to the windshield will not rebalance the bridge and the heating thereof will continue uninterrupted. The result of such uncontrolled heating in a windshield defrosting system herein used as an illustrative case, is to damage the windshield and to make its replacement necessary. In other situations, the uninterrupted energization of the circuit may result in damage to the circuit itself; to the electrical load which it operates; or to associated equipment. It should be noted that if a portion of either one of the resistors 26 or 28 is shorted out or either one of the arms 20 or 22 is opened up the flow of bridge current to the control winding 38 will be opposite in direction to the flow of current in the situation described above. Consequently the gate windings 42, 43 are non-conductive, and the failure is inherently safe.

The present invention is directed to de-energizing the heating circuit by rendering the gate windings non-conductive in the event of a failure of the type described above and which would otherwise permit the heating to continue uninterrupted. To accomplish this result a protective circuit is added across the junctions 34, 35 of bridge 12, in parallel to the circuit including control winding 38, in order that this circuit will also be responsive to differences in potential across the bridge 12. The protective circuit comprises a fail-safe winding 52 joined to the junction 34 at its one end by the conductor 53 and at its other end to the junction 35 by the conductor 54. A rectifier 55 is interposed in conductor 53 between the junction 34 and the fail-safe winding 52.

The fail-safe winding 52 is similar to the bias winding 40 previously described in that the magnetic field created by current flow through it is in opposition to the magnetic field created by current flow through the control winding 38. It has a greater number of ampere turns than does the control winding 38 so that the strength of its magnetic field, when energized, will be equal to or greater than the strength of the magnetic field of control winding 38 when the normal operating potential across the bridge is exceeded.

The rectifier 55 is inserted in the protective circuit to prevent premature or unwarranted energization of the protective circuit. It has been determined that the control voltages necessary to effect operation of the system under normal conditions are of a low order, normally not in excess of 0.3 volt. It has likewise been determined that in the event of a failure of the type described which results in the continued and uninterrupted application of heat to the windshield that the potential across the bridge may be as high as 6.0 volts, much greater relatively than normal control voltages. By selecting a rectifier for use in the protective circuit having characteristics such that it remains non-conductive until the potential across it exceeds 0.3 volt, the desired control of the protective circuit is achieved. Rectifier 55 is such a rectifier.

Also, the total resistance through the fail-safe protective circuit is less than that through the circuit including control winding 38. Therefore the protective circuit will receive a larger portion of the bridge current than will its parallel circuit.

Thus it can be seen that with voltages in excess of 0.3 volt, or the normal control voltages, the rectifier 55 becomes conductive and bridge current flows from the junction 34 through the fail-safe winding 52 and back to the other side of the bridge at junction 35. This current flow creates a magnetic field in opposition to the field of control winding 38, and, being of equal or greater strength, the gate windings 42, 43 are rendered nonconductive. The overall system fails in a safe and predictable manner as a result of the addition of the fail-safe protective circuit.

I claim:

1. In combination, an electrical heater, an alternating current power source connected in circuit with said heater, a relay for opening and closing the alternating current power circuit, and a fail-safe control means for automatically controlling said relay in response to temperature conditions in the region served by said heater and comprising a Wheatstone bridge, a source of direct current power connected across cooperating input and return points of the bridge, a temperature sensing winding connected in the bridge and effective to vary the electrical potential across the bridge in response to temperature variations in the region served by said heater, a magnetic amplifier including a pair of gate windings connected in parallel with said alternating current power source and in series with said relay, a control winding connected across cooperating output and return points of said bridge and serving when energized to render said gate winding conductive and thereby activate the relay, a bias winding connected in circuit with said direct current power source in parallel with said bridge and having a polarity opposite to that of said control winding, whereby the flow of current through said bias winding opposes the conductivity of said control winding, and a normally dormant protective circuit connected across said bridge in parallel with said control winding, said protective circuit comprising means for blocking the flow of bridge current therethrough when the potential across the bridge is below a predetermined value and a winding in series with said blocking means and having a polarity opposite to that of the control winding and providing a magnetic field of sufficient value to render the said control winding and consequently said gate windings nonconductive, when the potential across the bridge exceeds said predetermined value.

2. The combination structure defined in claim 1, wherein the said means for blocking the flow of bridge current is a rectifier which remains non-conductive so long as the potential across said rectifier is below a predetermined value.

3. In combination, an electrical load means, an alternating current power source connected in circuit with said load means, a relay actuated switch for opening and closing said alternating current power circuit, and a fail-safe control means for automatically controlling said relay comprising a Wheatstone bridge, a source of direct current power connected across cooperating input and return points of the bridge, a winding, the resistance of which is affected by the operation of said load means, connected in one arm of the bridge, a magnetic amplifier including a pair of gate windings connected in parallel with said alternating current power source and in series with said relay, a control winding connected across cooperating output and return points of said bridge and serving when energized to render said gate winding conductive and thereby activate the relay, a bias winding connected in circuit with said direct current power source in parallel with said bridge and having a polarity opposite to that of said control winding, whereby the flow of current through said bias winding opposes the conductivity of said control winding, and a normally dormant protective circuit connected across said bridge in parallel with said control winding, said protective circuit comprising means for blocking the flow of bridge current therethrough when the potential across the bridge is below a predetermined value and a winding in series with said blocking means and having a polarity opposite to that of the control winding and providing a magnetic field of sufficient value to render the said control winding and consequently said gate windings non-conductive, when the potential across the bridge exceeds said predetermined value.

References Cited in the file of this patent
UNITED STATES PATENTS

| | | |
|---|---|---|
| 2,431,151 | Tellegen | Nov. 18, 1947 |
| 2,680,186 | Pridmore | June 1, 1954 |
| 2,745,908 | Cohen et al. | May 19, 1956 |
| 2,762,967 | Stateman | Sept. 11, 1956 |
| 2,767,296 | Welch | Oct. 16, 1956 |
| 2,769,131 | Immel | Oct. 30, 1956 |
| 2,831,160 | Guth | Apr. 15, 1958 |
| 2,895,085 | Siedband | July 14, 1959 |